US008209434B2

(12) United States Patent
Wendelrup et al.

(10) Patent No.: US 8,209,434 B2
(45) Date of Patent: Jun. 26, 2012

(54) CONTINUED TRANSFER OR STREAMING OF A DATA FILE AFTER LOSS OF A LOCAL CONNECTION

(75) Inventors: Heino Wendelrup, Malmö (SE); Magnus Jendbro, Staffanstrop (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1213 days.

(21) Appl. No.: 11/469,954

(22) Filed: Sep. 5, 2006

(65) Prior Publication Data

US 2007/0299930 A1 Dec. 27, 2007

Related U.S. Application Data

(60) Provisional application No. 60/805,538, filed on Jun. 22, 2006.

(51) Int. Cl.
*G06F 15/16* (2006.01)
(52) U.S. Cl. ....................................................... 709/239
(58) Field of Classification Search .......... 709/230–232, 709/239; 370/225, 328, 331, 400; 455/436–445
See application file for complete search history.

(56) References Cited

U.S. PATENT DOCUMENTS

| 7,356,015 | B2 * | 4/2008 | Ibe et al. ........................ 370/338 |
| 2002/0082015 | A1 * | 6/2002 | Wu ................................. 455/436 |
| 2004/0233866 | A1 * | 11/2004 | Bossoli et al. ................. 370/328 |
| 2005/0076214 | A1 * | 4/2005 | Thomas et al. ................ 713/170 |
| 2005/0232242 | A1 * | 10/2005 | Karaoguz et al. ............. 370/352 |
| 2005/0271011 | A1 * | 12/2005 | Alemany et al. .............. 370/331 |
| 2006/0018309 | A1 * | 1/2006 | Lee et al. ....................... 370/355 |
| 2006/0135150 | A1 * | 6/2006 | Oh ................................. 455/425 |

FOREIGN PATENT DOCUMENTS

EP 1 480 408 11/2004

OTHER PUBLICATIONS

PCT Search Report and Written Opinion, Mar. 15, 2007, 9 pages.

* cited by examiner

*Primary Examiner* — Ajay Bhatia
(74) *Attorney, Agent, or Firm* — Harrity & Harrity, LLP

(57) ABSTRACT

A server receives a request for transfer or streaming of a data file sent in the local network from a portable communication device. The server provides the portable communication device with an identifier allowing the data file to be located on the server via a wide area network and transfers or streams the file over the local network to the portable communication device.

25 Claims, 4 Drawing Sheets

CONTINUED TRANSFER OR STREAMING OF A DATA FILE AFTER LOSS OF A LOCAL CONNECTION

RELATED APPLICATION

This application claims priority under 35 U.S.C. §119 based on U.S. Provisional Application Ser. No. 60/805,538, filed Jun. 22, 2006, the disclosure of which is hereby incorporated herein by reference.

TECHNICAL FIELD OF THE INVENTION

The present invention relates to transferring or streaming data files. More particularly, the present invention relates to transferring or streaming a data file from a data file server to a portable communication device.

DESCRIPTION OF RELATED ART

Portable communication devices, such as cellular phones, more and more frequently include various sorts of media playing functionalities. Content may then be transferred or streamed to such a device via, for instance, a data file server handling various types of data files in a local network when this functionality is to be used in the portable communication device.

However, as a portable communication device is moved around, it is possible that the data file being transferred or streamed may be interrupted because the connection over which the streaming or transfer was being made may be lost. This means that the user of the portable communication device will not be able to enjoy the data files in the way he/she expects.

Aspects of the invention advantageously provide a way to continue transferring or streaming a data file even though the connection is lost.

SUMMARY OF THE INVENTION

Aspects of the present invention are directed toward enabling a continued transferring or streaming of a data file between a portable communication device and a data file server in a local network even though a local connection is lost.

Aspects described herein provide a method of transferring or streaming at least one data file to a portable communication device from a data file server in a local network that can be continued even though a local connection is lost.

According to a first aspect of the present invention, a method of transferring or streaming at least one data file to a portable communication device from a data file server in a local network comprises the steps of: receiving a request for transfer or streaming of at least one data file from the portable communication device in the local network, providing the portable communication device with identifying data comprising an identifier allowing the data file to be located on the server via a wide area network, and transferring or streaming the file over the local network to the portable communication device as long as a local connection exists.

A second aspect of the present invention includes the features of the first aspect and further comprises the steps of: determining that a local connection no longer exists, disrupting the transferring or streaming, receiving a request, via a wide area network, for continued transfer or streaming over the wide area network and continuing the transfer or streaming of the data file over the wide area network.

A third aspect of the present invention includes the features of the second aspect and further comprises the steps of determining that a local connection once again exists, disrupting the transferring or streaming over the wide area network, and resuming transfer or streaming over the local network.

A fourth aspect of the present invention includes the features of the second aspect, wherein the identifying data comprises authentication data and further comprising the steps of receiving authentication data together with the request for continued transfer or streaming, determining if the correct authentication data has been provided and continuing the transfer only if the authentication data is correct.

A fifth aspect of the present invention includes the features of the second aspect, further comprising the step of determining a point in the data file after which continued transfer or streaming is to be made and continuing transfer or streaming from this point.

A sixth aspect of the present invention includes the features of the first aspect, further comprising the step of changing the coding of the file before transfer or streaming.

Other aspects of the present invention provide a data file server in a local network that enables a continued transferring or streaming of a data file between a portable communication device and the data file server even though a local connection is lost.

According to a seventh aspect of the present invention, a data file server in a local network comprises: an archive control unit controlling a data file archive and configured to receive a request for transfer or streaming of at least one data file from the portable communication device in the local network, provide the portable communication device with identifying data comprising an identifier allowing the data file to be located on the server via a wide area network, and transfer or stream the file over the local network to the portable communication device as long as a local connection exists.

An eighth aspect of the present invention includes the features of the seventh aspect, wherein the archive control unit is further configured to determine that a local connection no longer exists, disrupt the transfer or streaming, receive a request, via a wide area network, for continued transfer or streaming over this wide area network and continue the transfer or streaming of the data file over this wide area network.

A ninth aspect of the present invention includes the features of the eighth aspect, wherein the archive control unit is further configured to determine that a local connection once again exists, disrupt the transferring or streaming over the wide area network, and resuming transfer or streaming over the local network.

A tenth aspect of the present invention includes the features of the eighth aspect, wherein the identifying data comprises authentication data and the archive control unit is further configured to receive authentication data together with the request for continued transfer or streaming, determine if the correct authentication data has been provided and continue the transfer only if the authentication data is correct.

An eleventh aspect of the present invention includes the features of the tenth aspect, wherein the archive control unit is further configured to determine a point in the data file after which continued transfer or streaming is to be made and continuing transfer or streaming from this point.

A twelfth aspect of the present invention includes the features of the eighth aspect, wherein the archive control unit is further configured to determine a point in the data file after which continued transfer or streaming is to be made and continue transfer or streaming from this point.

A thirteenth aspect of the present invention includes the features of the seventh aspect, wherein the archive control unit is further configured to at least order the changing of the coding of the file before transfer or streaming.

A fourteenth aspect of the present invention is directed towards a data file server in a local network comprising: means for receiving a request for transfer or streaming of at least one data file from the portable communication device in the local network, means for providing the portable communication device with identifying data comprising an identifier allowing the data file to be located on the server via a wide area network, and means for transferring or streaming the file over the local network to the portable communication device as long as a local connection exists.

Additional aspects of the present invention provide a computer program product that enables a continued transferring or streaming of a data file between a portable communication device and a data file server in a local network even though a local connection is lost.

According to a fifteenth aspect of the present invention, a computer program product for transferring or streaming at least one data file to a portable communication device from a data file server in a local network comprises: computer program code, configured to make the data file server perform, when said program code is loaded in the data file server, a method comprising: receiving a request for transfer or streaming of at least one data file from the portable communication device in the local network, providing the portable communication device with identifying data comprising an identifier allowing the data file to be located on the server via a wide area network, and transferring or streaming the file over the local network to the portable communication device as long as a local connection exists.

Still other aspects of the present invention provide a method of receiving in a portable communication device at least one transferred or streamed data file from a data file server even though a local connection is lost.

According to a sixteenth aspect of the present invention, a method of receiving in a portable communication device at least one transferred or streamed data file from a data file server in a local network comprises the steps of: sending a request for transfer or streaming of at least one data file to the data file server via the local network, receiving identifying data comprising an identifier allowing the data file to be located on the server via a wide area network, and receiving the file or stream over the local network as long as a local connection exists.

A seventeenth aspect of the present invention includes the features of the sixteenth aspect and further comprises the steps of determining that a local connection no longer exists, sending a request, via a wide area network, for continued transfer or streaming over this wide area network using said identifier, and continuing receiving the file or stream over this wide area network.

An eighteenth aspect of the present invention includes the features of the seventeenth aspect and further comprises the steps of determining that a local connection once again exists, sending a request for resumed transfer or streaming over this local network, and resuming receiving the file or stream over the local network.

A nineteenth aspect of the present invention includes the features of the seventeenth aspect, wherein the identifying data comprises authentication data and further comprising the steps of sending authentication data together with the request for continued transfer or streaming, for safeguarding the transfer to the right recipient.

A twentieth aspect of the present invention includes the features of the sixteenth aspect, wherein the coding of the file has been changed before being received.

Still further aspects of the present invention are directed toward providing a portable communication device that allows continued transferring or streaming of a data file between a data file server in a local network and the portable communication device, which enables receiving the data file even though a local connection is lost.

According to a twenty-first aspect of the present invention, a portable communication device comprises: at least one communication unit for communicating in a local network and a wide area network, and a control unit configured to send a request for transfer or streaming of at least one data file to the data file server via the local network, receive identifying data comprising an identifier allowing the data file to be located on the server via a wide area network, and receive the file or stream over the local network as long as a local connection exists.

A twenty-second aspect of the present invention includes the features of the twenty-first aspect, wherein the control unit is further configured to determine that a local connection no longer exists, send a request, via the wide area network, for continued transfer or streaming over this wide area network using said identifier, and continue receiving the file or stream over this wide area network.

A twenty-third aspect of the present invention includes the features of the twenty-second aspect, wherein the control unit is further configured to determine that a local connection once again exists, send a request for resumed transfer or streaming over this local network, and resume receiving the file or stream over the local network.

A twenty-fourth aspect of the present invention includes the features of the twenty-second aspect, wherein the identifying data comprises authentication data and the control unit is further configured to send authentication data together with the request for continued transfer or streaming, for safeguarding the transfer to the right recipient.

A twenty-fifth aspect of the present invention includes the features of the twenty-first aspect, wherein the coding of the file has been changed before being received.

A twenty-sixth aspect of the present invention includes the features of the twenty-first aspect, wherein it is a cellular phone.

A twenty-seventh aspect of the present invention is directed toward a portable communication device comprising: means for sending a request for transfer or streaming of at least one data file to the data file server via the local network, means for receiving identifying data comprising an identifier allowing the data file to be located on the server via a wide area network, and means for receiving the file or stream over the local network as long as a local connection exists.

Additional aspects of the present invention provide yet another computer program product that enables a continued transferring or streaming of a data file between a portable communication device and a data file server in a local network even though a local connection is lost.

According to a twenty-eighth aspect of the present invention, a computer program product for receiving in a portable communication device at least one transferred or streamed data file from a data file server in a local network comprises: computer program code, configured to make the portable communication device execute, when said program code is loaded in the portable communication device, a method comprising: sending a request for transfer or streaming of at least one data file to the data file server via the local network, receiving identifying data comprising an identifier allowing the data file to be located on the server via a wide area network, and receiving the file or stream over the local network as long as a local connection exists.

Still additional aspects of the present invention provide a system that allows continued transferring or streaming of a data file between a data file server and the portable communication device even though a local connection is lost.

According to a twenty-ninth aspect of the present invention, a system for transferring or streaming at least one data file to a portable communication device from a data file server in a local network comprises: at least one radio communication unit, at least one data file archive, a data file server comprising an archive control unit controlling the data file archive and configured to receive a request for transfer or streaming of at least one data file from the portable communication device in the local network, provide the portable communication device with identifying data comprising an identifier allowing the data file to be located on the server via a wide area network, and transfer or stream the file over the local network to the portable communication device as long as a local connection exists, and a portable communication device having at least one communication unit for communicating in a local network and a wide area network, and a control unit configured to send said request for transfer or streaming, receive said identifying data, and receive said file or stream over the local network as long as the local connection exists.

Aspects of the invention provide, among other things, the following advantages. Aspects of the invention allow the continued transfer or streaming of files when a local connection is lost. Transfer or streaming is often slowed down because of a required change of coding. This means that a portable communication device that is to receive such a file may lose the local connection, for instance, if it moves out of the local network. Aspects describer herein, therefore, ensure that the content continues to be transferred or streamed in case the local connection is lost. Aspects described herein are also provided in a simple and user friendly way without a user having to get involved. That is, some of the aspects described herein may be automatically performed, without user input.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
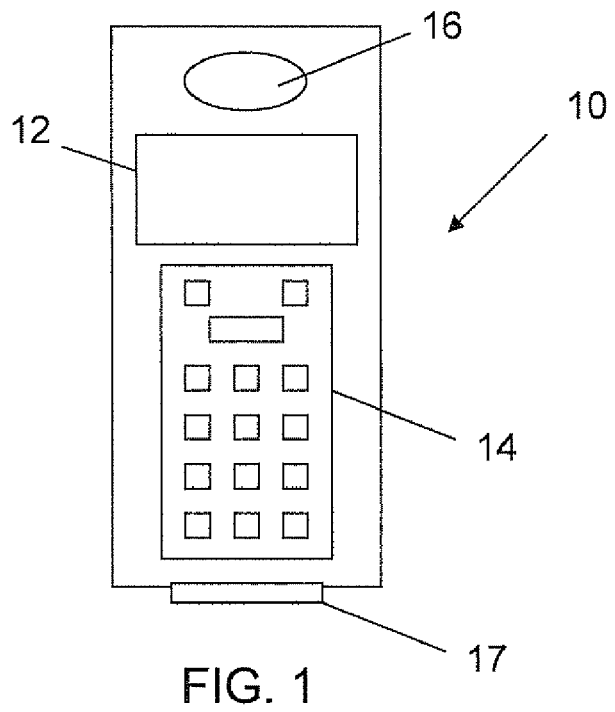
FIG. 1 shows a portable communication device in the form of a cellular phone.

A portable communication device 10 according to the present invention is shown in FIG. 1. In a preferred embodiment, the device is a cellular phone 10 having a display 12, a user input unit in the form of a keypad 14 including a number of keys as well as a speaker 16. The phone 10 also has a system connector 17. Via the system connector 17, it is possible to connect the phone to other devices such as a personal computer (PC) or a data file server. The keypad 14 is used for entering information, such as selecting of functions and responding to prompts and the display 12 is used for displaying functions and prompts to a user of the phone, as well as for presenting video. The speaker 16 is arranged to emit sound, such as speech or music being played by the phone or the sound associated with video. A cellular phone is just one example of a device in which aspects described herein can be implemented. The invention can for instance also be used in a PDA (personal digital assistant), a palm top computer, a lap top computer, a media player or any device that has media processing functionality, such as the ability to play or record media files, and the ability to connect to a data file server, such as via a wide area network (WAN), for instance using a PC card, as well as locally. The local connection is preferably a wireless connection, but may also be via a wired connection, such as a cable.

Figure 2:
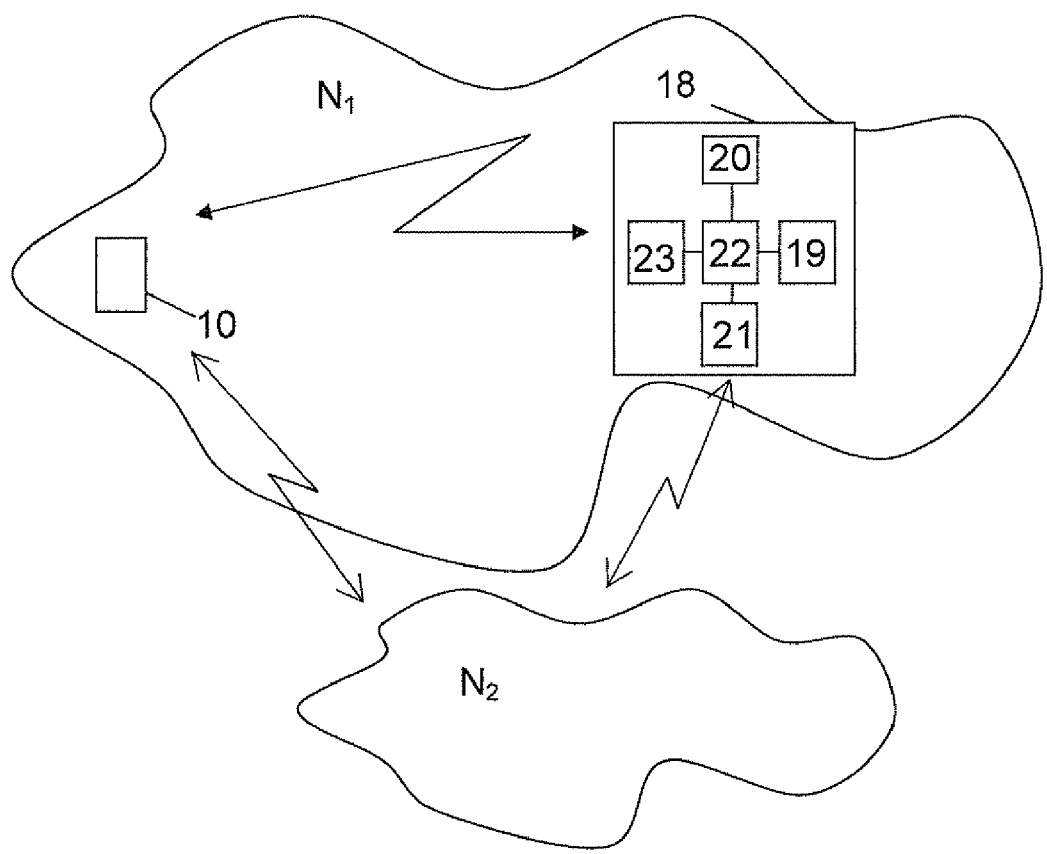
FIG. 2 schematically shows the device in FIG. 1 connected to a data file server in a local network and via a wide area network.

FIG. 2 shows the cellular phone 10 provided in a local wireless network $N_1$ and wirelessly communicating with a media file server 18 (also referred to herein as the data file server 18) also provided in the local network $N_1$. The local network $N_1$ is preferably a home network and it can include such other things as one or more PCs, stereo equipment, TVs, video equipment, etc. The local network $N_1$ is preferably a wireless local area network (LAN). Alternatively, other ways of providing local communication is possible, such as, for instance using Bluetooth™, universal serial bus (USB) ports on a computer and infrared (IR) links. The local network $N_1$ may have a limited physical extension, which means that the cellular phone 10 may for long periods of time be provided outside of the local network $N_1$. The data file server 18 may include a data file archive 20 comprising a number of data files, which may be music, for instance, which is coded or uncoded using MP3, and/or video files, such as DVD files. The data file server 18 furthermore may include an archive control unit 22, a code changing unit 19 as well as a first radio communication unit 21 and a second radio communication unit in the form of a proximity communication unit 23, which may be a WLAN or Bluetooth™ communication unit.

Since the portable communication device may be a cellular phone 10, it is also able to communicate using one or more wide area networks, where one network $N_2$ is shown in FIG. 2. This network may be a cellular GPRS network or a cellular UMTS network. The invention, however, is not limited to use in these types of networks, but can be implemented in any wireless wide area network allowing the transfer or streaming of data files. In addition, the data file server 18 may be able to communicate via network $N_2$ using the first radio communication unit 21. In this manner, the phone 10 has more than one route through which it may contact the data file server 18. In FIG. 2, the second network $N_2$ is shown as covering another area than the area covered by the local network $N_1$. However, it should be understood that in practice, the second network $N_2$ normally covers a very large area and normally also covers the area covered by the local network $N_1$.

Figure 3:
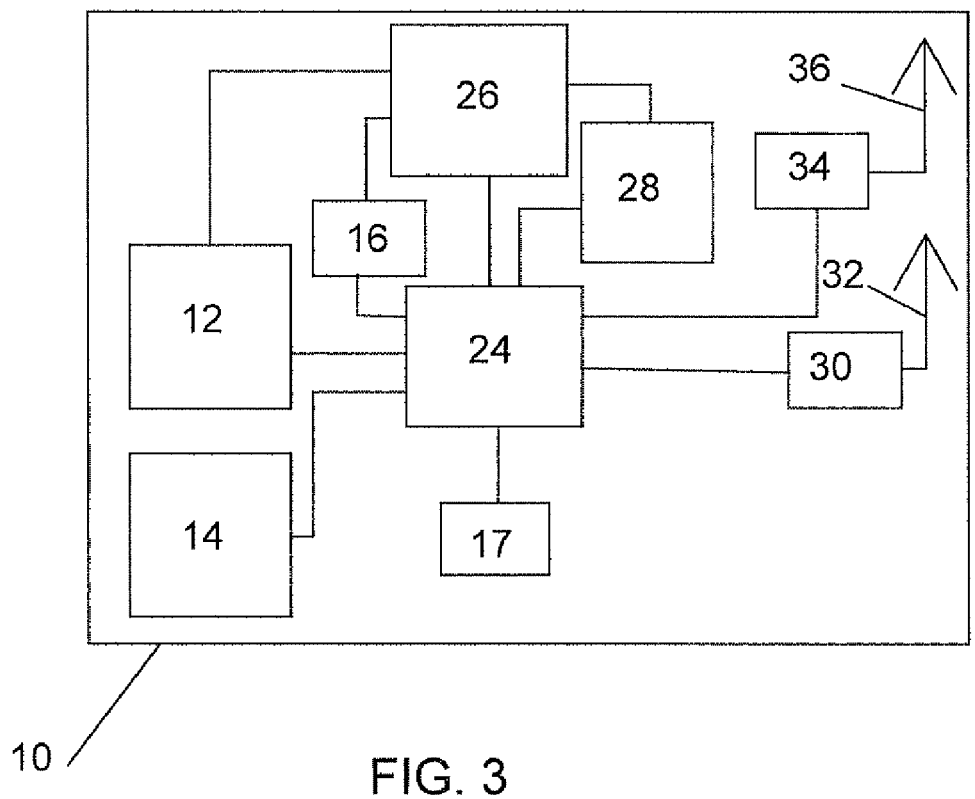
FIG. 3 shows a block schematic of relevant parts of the device in FIG. 1 for providing aspects described herein.

FIG. 3 shows a portion of the interior of the cellular phone 10 that is relevant with respect to aspects of the present invention. The phone 10 includes a control unit 24 connected to a third radio communication unit 30 for communication in the wide area network $N_2$, to a fourth radio communication unit in the form of a proximity communication unit 34, which may thus be a WLAN or Bluetooth™ communication unit for communication in the local network $N_1$, to a data processing unit 26, which in this embodiment is a DVD player, to the keypad 14, to the display 12, to a local file store 28, to the speaker 16 and to the system connector 17. The third radio communication unit 30 is connected to a first antenna 32 for communication with the wide area network $N_2$ and the fourth communication unit 34 is connected to a second antenna 36 for communication with the local network $N_1$. The data processing unit 26, (referred to in this embodiment as DVD player 26) is connected to the speaker 16 as well as to the file store 28 and the display 12. As an alternative, it is furthermore possible that several other types of data processing units are provided, in order to handle media of different types provided in the phone 10, such as, for instance, a music player and a camera and/or other media recording units as well as other media playing, editing and presenting units. Thus all types of units that can play, display, create, review or record media files can be used.

Figure 4:
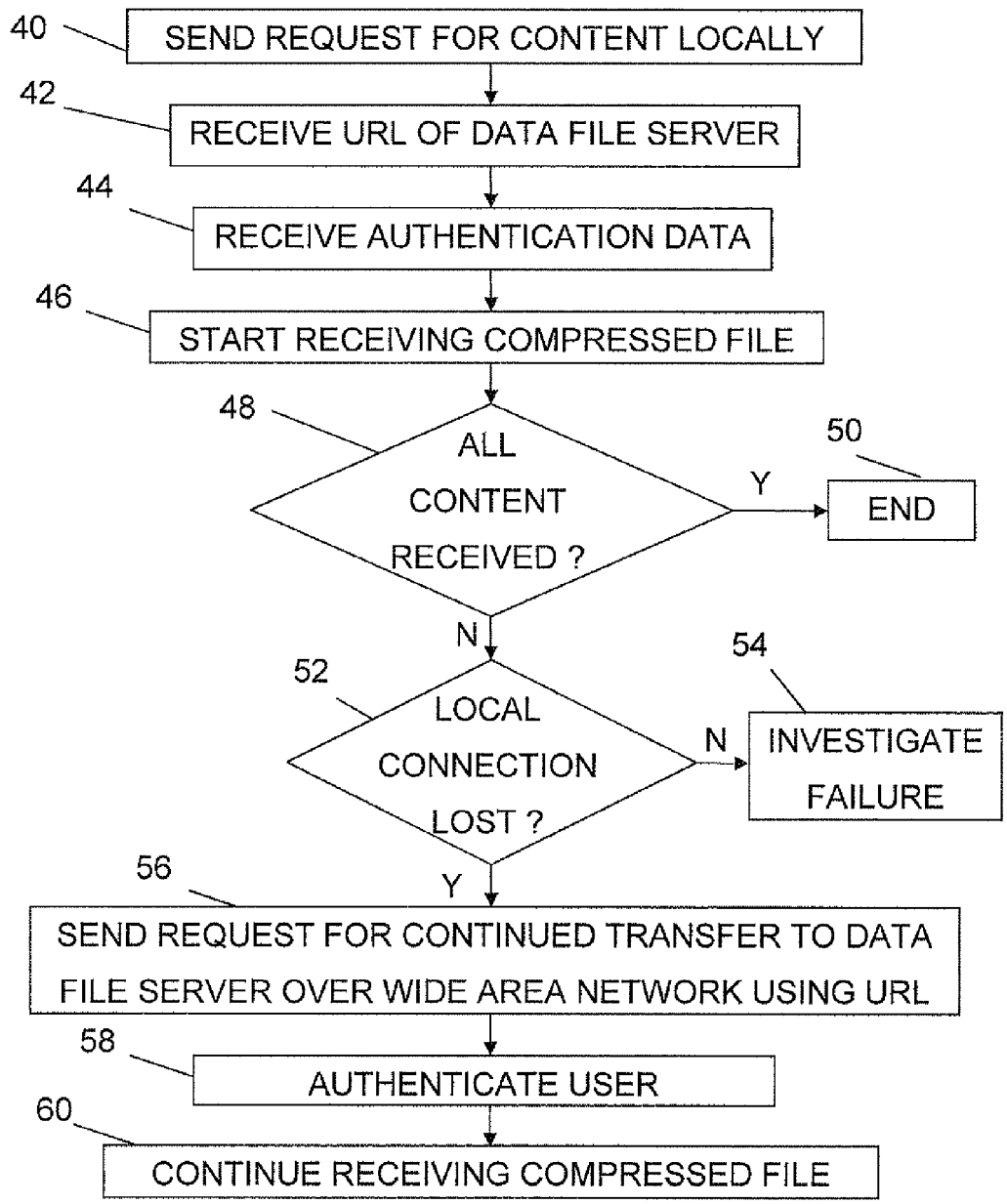
FIG. 4 shows a flow chart of a method of receiving a data file from the data file server according to an embodiment of the present invention.
Figure 5:
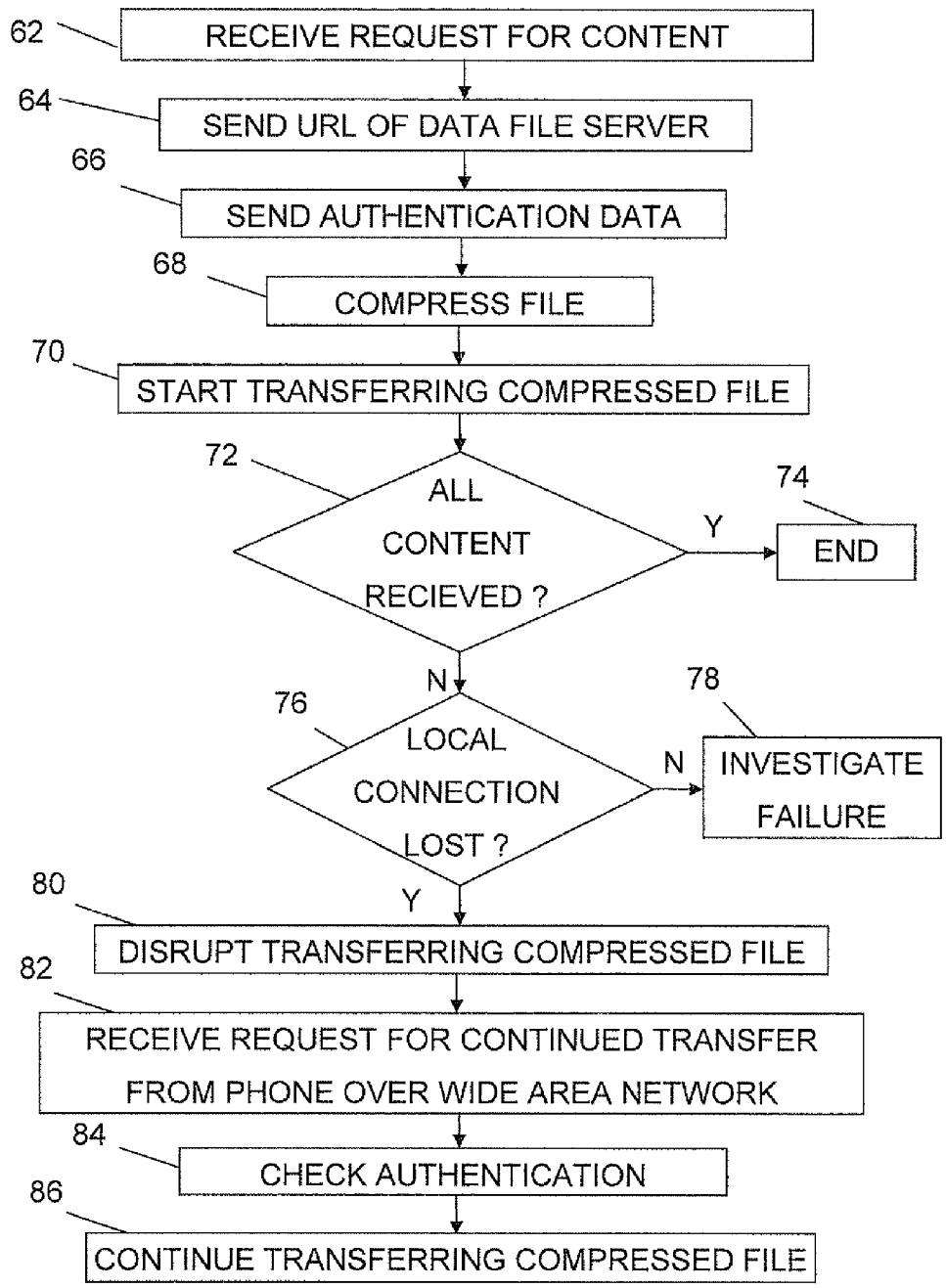
FIG. 5 shows a flow chart of a method of transferring a data file to the portable communication device according to an embodiment of the present invention.

The functioning of the present invention will now be described in relation to the previously described FIGS. 1-3 together with FIG. 4, which shows a flow chart of a method of receiving a data file from the data file server according to an embodiment of the present invention provided in the phone, and FIG. 5, which shows a flow chart of a method of transferring a data file to the portable communication device from the file server according to an embodiment of the present invention.

The present invention will in the following be described with an example in relation to a user, where media files are provided as video files, for instance DVD files. It should, however, be understood that the present invention can be used for other types of coding as well as other types of media files, such as, for instance, music files and image files. It may also be applied to already compressed files.

Figure 6:
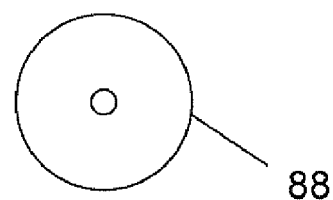
FIG. 6 shows a CD ROM disc on which program code for executing a method according to the invention is provided.

Assume that a user has a data file archive 20 provided in the server 18 in his home network $N_1$. Further assume that there are several data files in the data file archive 20. A user may wish to transfer or stream a file to the phone in order to enjoy the file at that location. A user may therefore select to transfer a data file, which in this example is a DVD video file to the cellular phone 10. The user may therefore select, via the keypad 14 of the phone 10 to transfer a DVD file from the data file archive 20 for watching a movie. The user may be provided with the possibility to browse the content of the data file archive 20 via a wireless connection in the local network $N_1$ between the data file server 18 and the phone 10 using the second and fourth radio communication units 23 and 34. The file selection is received by the control unit 24, which therefore sends a request for transfer of the selected content, i.e., data file, to the archive control unit 22 of the server 18 over a connection via the fourth and second radio communication units 34 and 23 (FIG. 4, block 40). This request is thus sent locally. The request may be received by the archive control unit 22 of the server 18 (FIG. 6, block 62).

Upon the reception of this request, the archive control unit 22 first retrieves an identifier of the server 18 associated with the wide area network $N_2$ as well as associated with the data file, which identifier in this embodiment is a uniform resource locator (URL) that enables the finding of an IP address of the server 18 in the network. The URL is here a podcast type link to the coded content, i.e., to the DVD file. The identifier in the form of the URL is then sent to the control unit 24 of the phone 10 over the local network $N_1$, (block 64), which URL is thus received by the phone control unit 24 (block 42). The archive control unit 22 also sends authentication data, for instance in the form of encryption and decryption keys (block 66), which authentication data is received by the phone control unit 24 also over the local network $N_1$ (block 44). Once this has been done, file transfer is now possible. The archive control unit 22 fetches the DVD file from data file archive 20 and forwards it to the code changing unit 19. The archive control unit 22 then orders the code changing unit 19 to change code, whereupon the code changing unit 19 changes the coding of the file and in this embodiment compresses the file (block 68). This may, for instance, be done in order to fit the file to the limited size of the display 12 in the phone 10. It is also possible to use other types of compression. Thereafter the archive control unit 22 starts transferring the compressed file to the phone control unit 24 over the local network $N_1$ (block 70), which control unit 24 thereby starts receiving the compressed file (block 46).

As the transfer is being made the archive control unit 22 checks if the phone 10 has received all the content, i.e., the whole DVD file (block 72), and if it has, the method is ended (block 74). Also the phone control unit 24 checks if the whole content has been received (block 48), and if it has, the method is ended also by the phone 10 (block 50). If not all content has been received by the phone (block 72), the archive control unit 22 investigates if the local connection has been lost (block 76). If the local connection has not been lost, the archive control unit 22 investigates the failure (block 78). In addition, the phone control unit 24 investigates if the local connection has been lost (block 52), in case all content has not been received, (block 48). If the local connection has not been lost (block 52), the phone control unit 24 may also investigate the failure (block 54), for instance through querying the archive control unit 22.

In case the local connection has been lost (blocks 52 and 76), which may be due to the fact that the phone 10 has moved out of the coverage of the local network $N_1$, the archive control unit 22 disrupts the transfer of the file (block 80), and determines a position in the file or a portion of the file that it knows that the phone 10 has received. Thereafter, it awaits the phone 10 once again connecting to it. The phone control unit 24, on the other hand, now sends a request for continued transfer to the data file server 18 over the wide area network $N_2$ using the third communication unit 30 (block 56). The phone control unit 24 may accomplish this through locating an IP-address of the server 18 associated with the URL it received. This address of the server 18 is typically obtained via a name lookup in a domain name system (DNS) server using the URL. The URL also directly locates the data file. The archive control unit 22 of the server 18 receives this request via the first communication unit 21 (block 82). Now the archive control unit 22 signals the phone control unit 24 to perform authentication. The phone control unit 24 now authenticates the user (block 58). This may be accomplished by using the authentication data it received when communicating in the local network $N_1$. The archive control unit 22 receives this authentication data and checks if it is the correct authentication data (block 84), and if the phone passes this check it continues transferring the DVD file to the phone control unit 24 (block 86). Here it continues transferring from the point it previously determined. In this maimer, the transfer of the file is continued as a podcast to the phone 10. The phone control unit 24 thus continues receiving the file over the wide area network $N_2$. When the whole file has been received, the phone control unit 24 stores it in the file store 28 and thereafter the user may now watch the DVD at his/her phone 10 via the DVD player 26.

It should here be realized that instead of transferring a file, a file may be streamed to the phone 10. In this case, change of coding may be performed through transcoding. It is also possible that no change of coding is performed. That is, it may not be needed because the file already has a suitable coding. In the case of transferring a file, a change of coding may also be made after the actual transfer has been made to the phone. The local connection may be provided using the system connector 17 and a cable, for instance, connected to a USB port of the server 18, as well as via Bluetooth™ or IR links. It should also be realized that both the phone and archive control units may keep checking if it is possible to communicate over the local network after connection has been lost the first time. Either of them may then decide to resume communication over the local network when it is again possible. Normally, however, the decision is made in the phone 10.

In this way, the invention allows the continued transfer or streaming of files when a local connection is lost. Transfer or streaming is often slowed down because of a required change of coding. This means that a portable communication device that is to receive such a file may lose all local connections, for instance, if it moves out of the local network. The present invention therefore ensures that the content is continued to be transferred or streamed in case the local connection is lost. It is furthermore provided in a simple and user friendly way without the user having to get involved (e.g., in an automatic maimer). Because of the authentication being made, the user is furthermore safeguarded from the wrong people getting hold of the content.

The control unit 24 and data processing unit 26 in the phone 10 according to the present invention are preferably provided in the form of one or more processors with corresponding memory containing the program code for performing the functions of these units, whereas the local storage is provided as a memory module or a part of as memory module, which may be a RAM, ROM, a flash memory or a memory stick. Normally the radio communication units are provided as separate hardware modules, for instance in the form of application specific integrated circuits (ASICs). They may however be combined in the same module. The different hardware units of the phone 10 may furthermore be connected using a data bus.

In the server 18, the archive control unit 22 and code changing unit 19 may likewise be implemented through the use of one or more processors with one or more corresponding memories comprising program code for performing their functions. The archive may be provided as one or more memory modules, for instance in form of hard discs and may furthermore be distributed throughout the local network. The radio communication units may here also be provided in the form of ASIC circuits.

The program code mentioned above can also be provided on one or more computer program products such as a CD ROM disc 88 as depicted in FIG. 6, which will perform the invention when loaded into a phone having suitable processing capabilities or when loaded into the server. Naturally other types of products can be provided for this, such as, for instance, a removable memory such as a memory stick, or another computer readable medium. The computer program product can also be provided as software, which is downloaded remotely from a server either outside or inside the cellular network or be downloaded via a computer like a PC to which the phone is temporarily connected.

There are a number of further variations that can be made to the present invention in addition to those already mentioned. The local network may include only the server 18 and the phone 10. It is thus also possible that the phone 10 communicates directly with the server 18. The local network may also include several other devices. The server 18 may furthermore be provided in a DVD player, a stereo or other such device. The radio communication units of the local network may be provided in each device, such as in the server 18, but the server 18 may just as well have a link to a radio communication unit provided as a separate entity in the local network. The same is also true for the code changing unit 19. The server 18 may thus have a link to a code changing unit provided as a separate entity in the network. It is also possible that the data file archive 20 is provided as an entity that is separate from the archive control unit 22.

Although the present invention has been described in connection with specific embodiments, it is not intended to be limited to the specific form set forth herein. Rather, the scope of the present invention is limited only by the accompanying claims and their equivalents.

What is claimed is:

1. A method, comprising:
    forwarding, from a data file server device and via a local network that includes a wireless personal area network (WPAN), a listing to a portable communication device, the listing identifying a WPAN address, associated with the WPAN, for at least one data file stored on the data file server device, where the data file server device and the portable communication device are associated with a user;
    receiving, at the data file server device and from the portable communication device via the local network, a local request, based on the WPAN address, for the at least one data file;
    in response to receiving the local request initiating, by the data file server device, a first transfer, via the WPAN, of the at least one data file to the portable communication device, where initiating the first transfer further includes:
        providing, to the portable communication device, a wide area network address for the at least one data file on a wide area network that is separate from the WPAN;
    detecting, by the data file server device, that the portable communication device lost communications with the WPAN;
    interrupting, by the data file server device, the first transfer of the at least one data file in response to detecting that the portable communication device lost communications with the WPAN;
    determining, by the data file server device, a portion of the at least one data file that was not transferred, over the WPAN, to the portable communication device prior to interrupting the first transfer of the at least one data file;
    receiving, at the data file server device and via the wide area network, a wide area request, the wide area request being from the portable communication device and being based on the wide area network address; and
    in response to receiving the wide area request, automatically initiating, from the data file server device and via the wide area network, a second transfer that includes the portion of the at least one data file, to the portable communication device.

2. The method according to claim 1, further comprising:
    determining that a connection on the WPAN is available between the data file server device and the portable communications device;

disrupting the second transfer of the portion of the at least one data file over the wide area network; and resuming the first transfer of the at least one data file over the WPAN after disrupting the second transfer.

3. The method according to claim 1, where providing the identifying data comprises authentication data, the method further comprising:

determining whether the wide area request includes the authentication data; and continuing the second transfer over the wide area network when the wide area request includes the authentication data.

4. The method according to claim 1, further comprising:

determining a point in the at least one data file after which the second transfer is to begin, where the second transfer begins from the point.

5. The method according to claim 1, further comprising:

changing an encoding of the at least one data file before initiating the first transfer.

6. A data file server in a local network that includes a wireless personal area network (WPAN), comprising:

an archive control unit to:

control a data file archive that includes at least one data file, receive a first request, based on a WPAN address associated with the data file archive, for a transfer or a streaming of the at least one data file, where the request is received from a portable communication device and over the local network, initiate the transfer or the streaming of the at least one data file to the portable communication device via a WPAN connection on the local network, where the archive control unit, when initiating the transfer or the streaming of the at least one data file to the portable communication device, is further to provide the portable communication device with identifying data comprising an identifier, where the identifier enables the portable communication device to locate the at least one data file on the data file server via a wide area network, and where the identifier includes an address for the data file server on the wide area network, determine that the WPAN connection is disrupted, where the archive control units determines that the WPAN connection is disrupted when the portable communication device is no longer in communication with the data file archive via the WPAN, when the WPAN connection is determined to be disrupted, interrupt the transfer or streaming of the at least one data file to the portable communication device via the WPAN connection, determine a portion of the at least one data file that was not transferred or streamed to the portable communication device prior to the transfer or streaming being interrupted, receive a second request, based on the identifier and via the wide area network, for a continued transfer or a continued streaming of the at least one data file over the wide area network in response to the WPAN connection being disrupted, and initiate, in response to receiving the second request, the continued transfer or the continued streaming of the portion of the at least one data file to the portable communication device over the wide area network.

7. The data file server according to claim 6, where the archive control unit is further to:

determine that the WPAN connection is reestablished with the portable communication device, disrupt the continued transfer or the continued streaming over the wide area network, when WPAN connection is reestablished, and resume the transfer or the streaming over the local network after disrupt the continued transfer or the continued streaming.

8. The data file server according to claim 6, where the identifying data comprises authentication data, and where the archive control unit is further to:

determine whether the second request includes the authentication data, and continue the continued transfer or the continued streaming when the second request includes the authentication data.

9. The data file server according to claim 8, where the archive control unit is further to:

determine a point in the at least one data file after which the continued transfer or the continued streaming is to begin, where the continued transfer or the continued streaming begins from the point.

10. The data file server according to claim 6, where the archive control unit is further to:

determine a point in the data file after which the continued transfer or the continued streaming is to begin, where the continued transfer or the continued streaming begins from the point.

11. The data file server according to claim 6, where the archive control unit is further to:

change an encoding of the at least one data file before initiating the transfer or the streaming.

12. A data file server in a local network, comprising:

means for receiving a first request for transferring or streaming at least one data file, where the request is received from a portable communication device over the local network, where the local network includes a Bluetooth network, and where the first request includes a local identifier for transferring or streaming the at least one data file over the local network;

means for transferring or streaming the at least one data file, over the local network to the portable communication device, where the transferring or streaming means includes:

means for providing identifying data when transferring or streaming the at least one data file to the portable communication device, where the identifying data includes a wide area identifier that enables the portable communications device to locate the at least one data file on the data file server via a wide area network, where the wide area identifier includes an address for the data file server on the wide area network;

means for detecting that a local connection, over the local network, is disrupted;

means for interrupting the transferring or streaming of the at least one data file in response to detecting that the local connection is disrupted;

means for determining a portion of the at least one data file that was not transferred or streamed prior to interrupting the transferring or streaming of the at least one data file;

means for receiving a second request, based on the wide area identifier and via the wide area network, for transferring or streaming of the at least one data file over the wide area network; and means for transferring or streaming the portion of the at least one data file to the portable communication device over the wide area network, in response to receiving the second request.

13. A computer program product, tangibly stored on a computer-readable storage medium, comprising instructions to cause a programmable processor to implement a method comprising:
  forwarding, via a local network that includes a personal area network (PAN), a listing to a portable communication device, the listing comprising at least one data file on a data file server device;
  receiving, via the local network, a local request from the portable communication device for the at least one data file;
  initiating, via the local network, a transfer of the at least one data file to the portable communication device, where initiating the transfer includes:
    providing, via the local network and to the portable communications device, identifying data, the identifying data comprising an identifier that enables the portable communication device to locate, via a wide area network, the at least one data file on the data file server device, the wide area network being separate from the local network, where the identifier includes an address for the data file server device on the wide area network, and where the identifier is not used for the transfer of the at least one data file via the local network;
  after initiating the transfer of the at least one data file, detecting, without communicating with the portable communications device, that the portable communication device did not receive a portion of the at least one data file;
  receiving, via the wide area network and based on the identifier, a wide area request from the portable communication device after detecting that the portable communication device did not receive a portion of the at least one data file; and
  in response to the wide area request, automatically transferring, from the data file server device and via the wide area network, the portion of the at least one data file to the portable communication device.

14. A method of receiving, in a portable communication device, at least one data file from a data file server in a local network, comprising:
  sending, by the portable communication device, a first request for the at least one data file, where the first request is sent to the data file server via the local network;
  receiving, by the portable communications device and via a local connection over the local network, a portion of the at least one data file and identifying data comprising an identifier that enables the portable communications device to locate the at least one data file on the data file server via a wide area network, where the identifier includes an address for the data file server on the wide area network, where the local connection includes a Bluetooth connection, where identifier is not used, by the portable communications device, for receiving the portion of the at least one data file via the Bluetooth connection, and where the local connection is lost before an entirety of the at least one data file is received;
  in response to the local connection being lost, sending, by the portable communications device, a second request to access, using the identifier, the at least one data file over the wide area network, where the second request does not identify the portion of the data file received by the portable communication device; and
  receiving, by the portable communications device, another portion of the at least one data file over the wide area network, where the other portion of the data file, received over the wide area network, differs from the portion of the data file received over the local connection.

15. The method according to claim 14, further comprising:
  determining that the local connection to the data file server is reestablished;
  in response to determining that the local connection to the data file server is reestablished, sending a third request to receive a third portion of the at least one data file via the local connection, where the third portion differs from the portion and the other portion; and
  receiving the third portion of the at least on data file via the local connection in response to the request.

16. The method according to claim 15,
  where the identifying data comprises authentication data, and
  where at least one of the first request, the second request, or the third request includes the authentication data.

17. The method according to claim 14, where an encoding of the at least one data file is changed before being received by the portable communications device.

18. A portable communication device comprising:
  at least one communication unit to communicate with a data file server via a local network and via a wide area network; and
  a control unit to
    access, using the at least one communication unit and via a Bluetooth connection over the local network, at least one data file at the data file server, where the control unit, when accessing the at least one data file, is further to:
      receive, via the at least one communication unit, identifying data comprising an identifier that allows the control unit to locate, via the wide area network, the at least one data file on the data file server, where the identifier includes an address for the data file server on the wide area network, and where the identifier is not used by the control unit to access the at least one data file,
    determine that the Bluetooth connection is disrupted, where the portable communication device does not receive, over the Bluetooth connection, a portion of the at least one data file prior to the Bluetooth connection being disrupted, and
    when the Bluetooth connection is disrupted, using the identifier to continue to access, over the wide area network, the at least one data file on the data file server, where the control unit, when using the identifier to continue to access, over the wide area network, the at least one data file on the data file server, does not identify the portion of the at least one data file not received over the Bluetooth connection.

19. The portable communication device according to claim 18, where the control unit is further to:
  determine that the Bluetooth connection is reestablished,
  cease access, via the wide area network, to the at least one data file on the data file server, and
  resume, via the Bluetooth connection, access to the at least one data file on the data file server.

20. The portable communication device according to claim 18, where the identifying data comprises authentication data and the control unit is further to:

send the authentication data to the data file server when accessing the at least one data file via at least one of the local network or the wide area network.

21. The portable communication device according to claim 18, where encoding of the at least one data file is changed while being accessed by the portable communication device.

22. The portable communication device according to claim 18, where the portable communication device comprises a cellular phone.

23. A portable communication device comprising:
  means for sending a first request for transfer or streaming of at least one data file, where the first request is sent to a data file server via a local network;
  means for receiving, in response to the request, a portion of the at least one data file via a local connection over the local network, where the local connection includes a Bluetooth connection and where the local connection is disrupted before all of the at least one data file is received;
  means for receiving, when receiving the portion of the at least one data file via the local connection, identifying data comprising an identifier that enables the portable communication device to locate the at least one data file on the data file server via a wide area network, where the identifier includes an address for the data file server on the wide area network, and where the identifier is not used for transferring or streaming at least one data file via a local network;
  means for sending, in response to the local connection being disrupted, a second request to access the at least one data file over the wide area network, where the request includes the identifier and does not identify the portion of the at least one data file received via a local connection over the local network; and
  means for receiving another portion of the at least one data file over the wide area network in response to the second request.

24. A computer program product, tangibly stored on a computer-readable storage medium, comprising instructions to cause a programmable processor to implement a method comprising:
  sending a first request for at least one data file, where the first request is sent to a data file server via a local network;
  receiving a portion of the at least one data file via a local connection over the local network, where the local connection is lost before another portion of the at least one data file is received, where the local connection includes a Bluetooth connection, and where receiving the portion of the at least one data file includes:
    receiving identifying data comprising an identifier that enables a portable communications device to locate the at least one data file on the data file server via a wide area network, where the identifier includes an address for the data file server on the wide area network, and where the identifier is not used when receiving the portion of the at least one data file via the local connection;
  in response to the local connection being lost, sending a second request to access, using the identifier, the at least one data file over the wide area network, where the second request does not identify either the portion of the at least one data file or the other portion of the at least one data file; and
  receiving the other portion of the at least one data file over the wide area network in response to the second request.

25. A system for transferring or streaming at least one data file to a portable communication device from a data file server in a local network, the system comprising:
  a data file server associated with a user, the data file server comprising an archive control unit to:
    receive, from the portable communication device in the local network, a first request for transfer or streaming of at least one data file,
    transfer or stream the data file over the local network to the portable communication device via a local connection, where the local connection includes a Bluetooth connection, and where the archive control unit, when transferring or streaming the data file, is further to provide the portable communication device with identifying data comprising an identifier allowing the data file to be located on the data file server via a wide area network, where the identifier includes an address for the data file server on the wide area network, and where the identifier is not used to transfer or stream the data file over the local network,
    detecting that the local connection is disrupted,
    determine a portion of the data file that was not transferred or streamed to the portable communication device prior to the local connection being disrupted,
    after the local connection is disrupted, receive a second request for transfer or streaming of at least one data file from the portable communication device in the wide area network, and
    in response to the second request, transfer or stream the portion of the data file over the wide area network to the portable communication device; and
  the portable communication device associated with the user, the portable communication device comprising:
    at least one communication unit for communication in the local network and the wide area network, and
    a control unit to:
      send the first request for transfer or streaming over the local network,
      receive the identifying data,
      send the second request, based on the identifying data, for transfer or streaming over the wide area network,
      receive another portion of the data file over the local connection when the local connection has been disrupted, and
      receive the portion of the data file over the wide area network when the local connection has been disrupted.

* * * * *

UNITED STATES PATENT AND TRADEMARK OFFICE
CERTIFICATE OF CORRECTION

PATENT NO. : 8,209,434 B2
APPLICATION NO. : 11/469954
DATED : June 26, 2012
INVENTOR(S) : Heino Wendelrup et al.

It is certified that error appears in the above-identified patent and that said Letters Patent is hereby corrected as shown below:

On the Title Page Item (75)
Inventor Correction should read as follows: "Magnus Jendbro, Staffanstorp (SE)"

Signed and Sealed this
Twenty-fifth Day of September, 2012

David J. Kappos
*Director of the United States Patent and Trademark Office*